United States Patent
Cho et al.

(10) Patent No.: US 8,487,852 B2
(45) Date of Patent: Jul. 16, 2013

(54) ACTIVE ARRAY SUBSTRATE, LIQUID CRYSTAL DISPLAY PANEL AND METHOD FOR DRIVING THE SAME

(75) Inventors: Ting-Yi Cho, Hsin-Chu (TW);
Chieh-Wei Chen, Hsin-Chu (TW);
Te-Wei Chan, Hsin-Chu (TW);
Cheng-Han Tsao, Hsin-Chu (TW);
Kung-Ching Chu, Hsin-Chu (TW);
Chung-Yi Chiu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 648 days.

(21) Appl. No.: 12/606,285

(22) Filed: Oct. 27, 2009

(65) Prior Publication Data

US 2010/0245222 A1 Sep. 30, 2010

(30) Foreign Application Priority Data

Mar. 24, 2009 (TW) .............................. 98109607 A (51) Int. Cl.
*G09G 3/36* (2006.01)

(52) U.S. Cl.
USPC .......................................................... 345/89

(58) Field of Classification Search
USPC .................... 345/89; 349/130–136, 139, 141, 349/143
See application file for complete search history.

(56) References Cited

U.S. PATENT DOCUMENTS

| 6,977,704 | B2 | 12/2005 | Kataoka | |
|---|---|---|---|---|
| 2003/0071952 | A1 | 4/2003 | Yoshida et al. | |
| 2005/0219453 | A1* | 10/2005 | Kubo et al. | 349/143 |
| 2006/0146243 | A1 | 7/2006 | Nakanishi et al. | |
| 2007/0121048 | A1 | 5/2007 | Hsu et al. | |
| 2008/0036355 | A1* | 2/2008 | Chan et al. | 313/326 |
| 2008/0198285 | A1* | 8/2008 | Hsieh et al. | 349/39 |
| 2009/0046233 | A1* | 2/2009 | Cho et al. | 349/141 |

\* cited by examiner

*Primary Examiner* — Alexander S Beck
*Assistant Examiner* — Tony N Ngo
(74) *Attorney, Agent, or Firm* — Rabin & Berdo, P.C.

(57) ABSTRACT

An active array substrate, a liquid crystal display panel and method for driving the same are provided. The active array substrate includes a plurality of first strip electrodes and second strip electrodes. The sum of one width of the first stripe electrode and one pitch between two adjacent first stripe electrodes is greater than that of one width of the second strip electrode and one pitch between two adjacent second strip electrodes.

20 Claims, 13 Drawing Sheets

ACTIVE ARRAY SUBSTRATE, LIQUID CRYSTAL DISPLAY PANEL AND METHOD FOR DRIVING THE SAME

This application claims the benefit of Taiwan Patent Application Serial No. 98109607, filed Mar. 24, 2009, the subject matter of which is incorporated herein by reference.

BACKGROUND OF THE INVENTION

1. Field of the Invention

The present invention generally relates to an active array substrate, a liquid crystal display panel and method for driving the same, especially relating to a liquid crystal display panel which displays uniform images.

2. Description of Related Art

As specification of liquid crystal display (LCD) has a tendency to big size, in order to solve some problems relating to viewing angle, technology of wide viewing angle has been developed. MVA LCD (multi-domain vertical alignment LCD) is one of the popular.

Liquid crystal molecules in a single pixel area are divided to different alignment to achieve wide viewing, i.e. MVA LCD, result by controlling designs of alignment patterns of liquid crystal display panel. Because of optical character of liquid crystal molecules, color washout may occur while viewing the panel at different angles. Therefore, by changing driving method and pixel design to form areas with different brightness in a single pixel area, the phenomenon can be improved.

Figure 1:
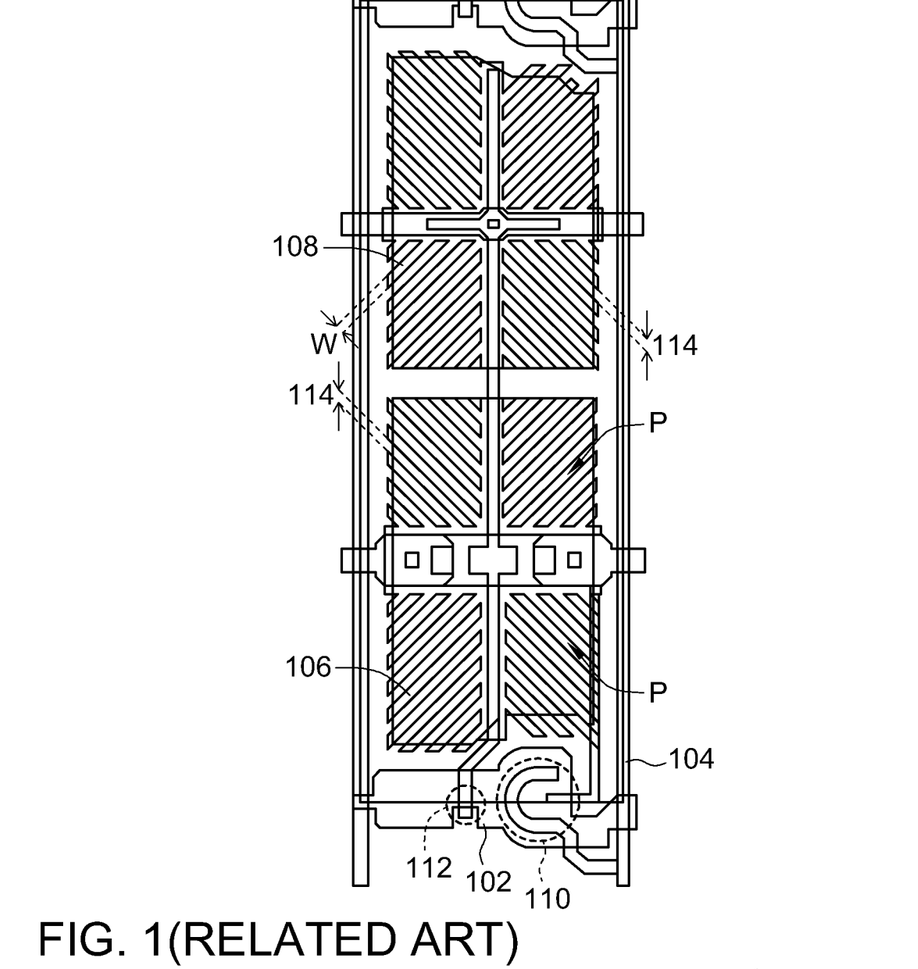
FIG. 1 is a top view of a conventional active array substrate.

FIG. 1 is a perspective view of a part of a conventional liquid crystal display panel. Liquid crystal display panel 100 includes scan lines 102, data lines 104, pixel electrodes 106 and 108, first active devices 110 and second active device 112. FIG. 1 shows only one pixel for explanation. Scan line 102 and data line 112 are electrically connected with first active device 110 and second active device 112, respectively. First active device 110 and second active device 112 are electrically connected with pixel electrodes 106 and 108, respectively. Each of pixel electrodes 106 and 108 has strip electrodes (not marked). At least one slit 114 is formed between adjacent strip electrodes. Slit 114 has width W. Slits 114 are used to control the alignment direction of liquid crystal molecules of the liquid crystal display panel 100. Slits 114 of each of pixel electrodes 104 and 106 have 4 extension directions, that is to say, an area of each of pixel electrodes 104 and 106 can be divided into 4 alignment areas P with different alignment directions. Taiwan patent application No. 96135918 is incorporated herein for reference.

Generally, extension direction of sits 114 of each alignment area P and that of data line 102 form an angle of 45°, as shown in FIG. 1, therefore, at every viewing angles, image results and scope can be identical. However, because of user habits and product design, viewing angles and image quality are asked for high level.

SUMMARY OF THE INVENTION

Accordingly, the present invention is directed to a liquid crystal display panel with uniform brightness.

An objective of the present invention is to provide an active array substrate and a method for driving the same.

An objective of the present invention is to provide an active array substrate. The active array substrate includes a base, scan lines, data lines, and pixel units. The scan lines are disposed on the base. The data lines are disposed on the base and perpendicular to the scan lines. The pixel units are electrically connected with corresponding scan lines and data lines. Each of the pixel units includes a first active device, a second device, a first pixel electrode and a second pixel electrode. The first and second active devices are electrically connected with corresponding scan lines and data lines. The first pixel electrode is located in a first area, and having first strip electrodes. The first pixel electrode is electrically connected with the first active device. The second pixel electrode is located in a second area, and having second strip electrodes. The second pixel electrode is electrically connected with the second active device. The brightness of the first area is greater than that of the second area. The sum of the width of one of the first strip electrodes and the gap of two adjacent first strip electrodes is greater than that of the width of one of the second strip electrodes and the gap of two adjacent second strip electrodes.

In accordance with the above objectives and other objectives, the present invention further provides a liquid crystal display panel including the active array substrate.

In accordance with the above objectives and other objectives, the present invention provides a method for driving the liquid crystal display panel.

In accordance with the above objectives and other objectives, the present invention provides a method for driving the liquid crystal display panel, so that the liquid crystal display panel can display images with uniform brightness.

In accordance with the above objectives and other objectives, the present invention provides a method for driving the liquid crystal display panel, the method including providing the active array substrate, providing a low gray level data voltage to the first pixel electrode of one of the pixel units, to make the brightness of the first area greater than that of the second area thereof to display a low gray level image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

As the width of the slit 114 is greater, the light transmitting ratio of the liquid crystal display panel 100 is decreasing. As the width W of the strip electrode is greater, the light transmitting ratio of the liquid crystal display panel 100 is increasing. However, if the width W of the strip electrode is too large, the control over the liquid crystal molecules by the pixel electrodes 106 and 108 would be influenced, as a result, the light transmitting ratio of the liquid crystal display panel 100 would decrease too much. That is to say, if the width W of the strip electrode is too large, liquid crystal molecules at the inner edges of the strip electrodes would have unexpected tilting angle or direction, so that the light transmitting ratio is reduced. Besides, if the width W of the strip electrode is decreasing, in a manufacturing process, the percentage of process variation would be larger, which means the difference (ΔW) between the biggest width W of the strip electrode and the smallest width W of the strip electrode would be increased. Therefore, widths W of the strip electrodes in an area are very different, and the brightness of the liquid crystal display panel 100 would be non-uniform.

Therefore, the present invention is provided to increase the viewing angles in at least one specific direction, decrease the possibility of color washout, and keep uniform brightness of the display device.

Figure 2:
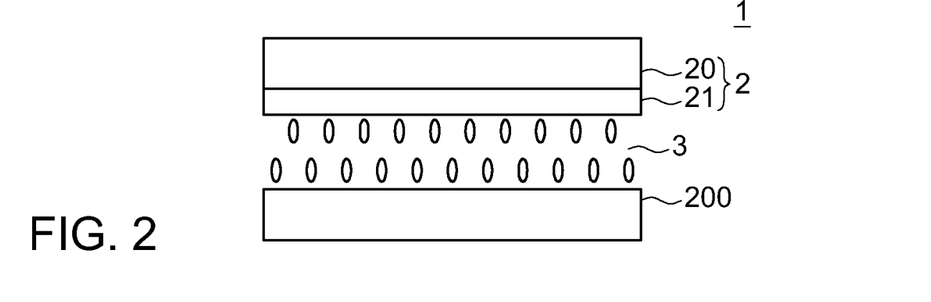
FIG. 2 is a liquid crystal display panel according to the present invention.

FIG. 2 is a liquid crystal display panel according the present invention. Liquid crystal display panel 1 includes active array substrate 200, opposite substrate 2 and liquid crystal layer 3. Liquid crystal layer 3 is located between the active array substrate 200 and opposite substrate 2. Opposite substrate 2 includes base 20 and common electrode 21. Common electrode 21 is provided with common voltage COM. The active array substrates 200 of the embodiments of the present invention are shown below.

The liquid crystal display panel is MVA LCD panel or polymer stabilized alignment display panel (PSA LCD panel), for example.

First Embodiment

Figure 3A:
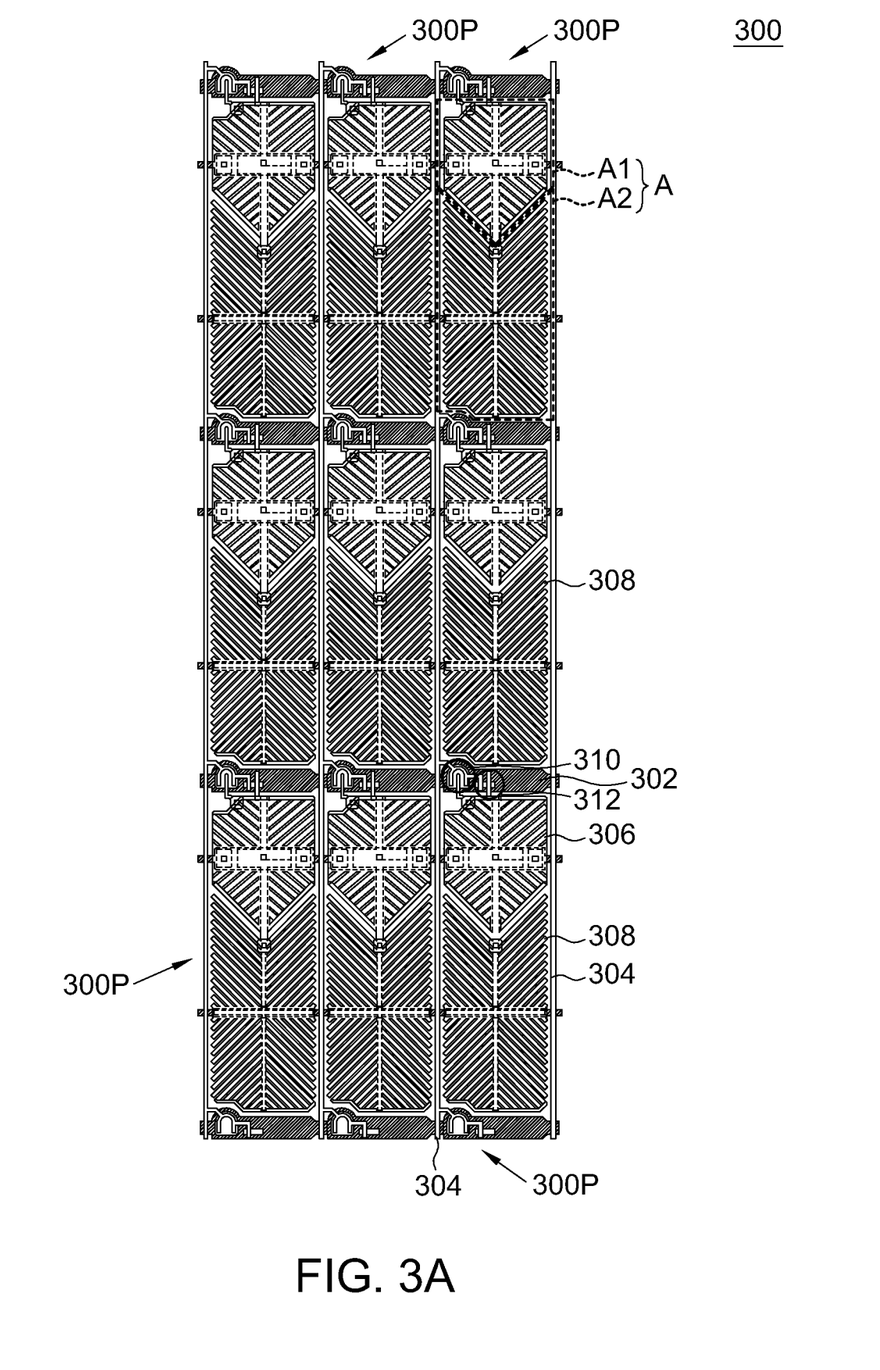
FIG. 3A is a top view of an active array substrate according to the first embodiment of the present invention.
Figure 3B:
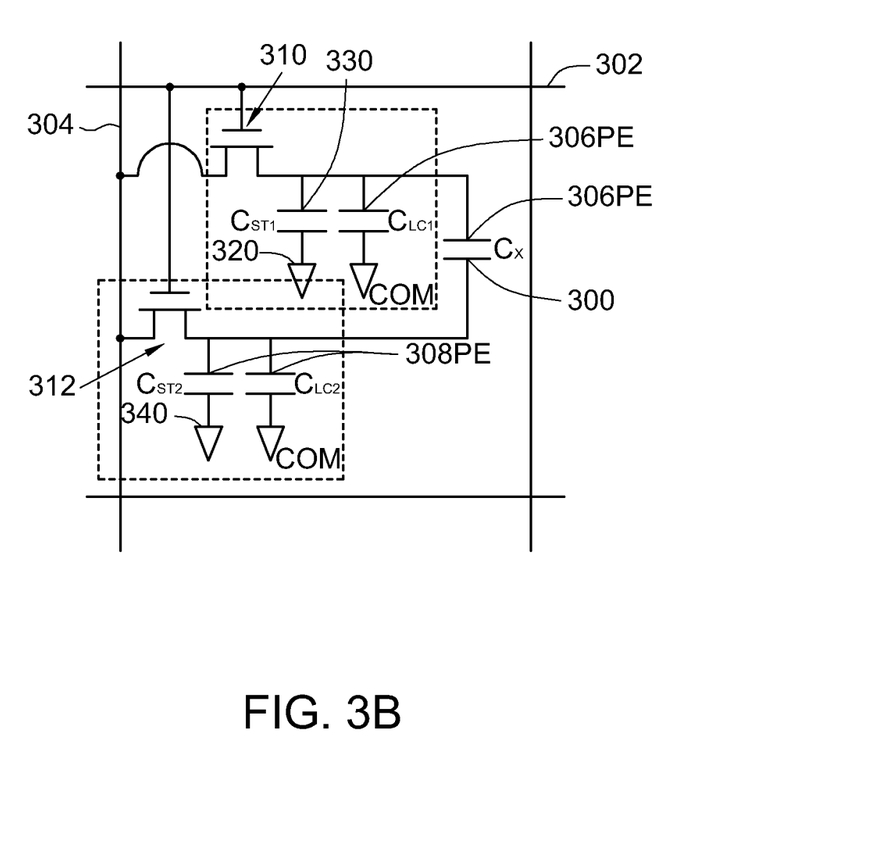
FIG. 3B shows an equivalent circuit of a pixel area of the active array substrate incorporated with the opposite substrate according to the first embodiment of the present invention.
Figure 3C:
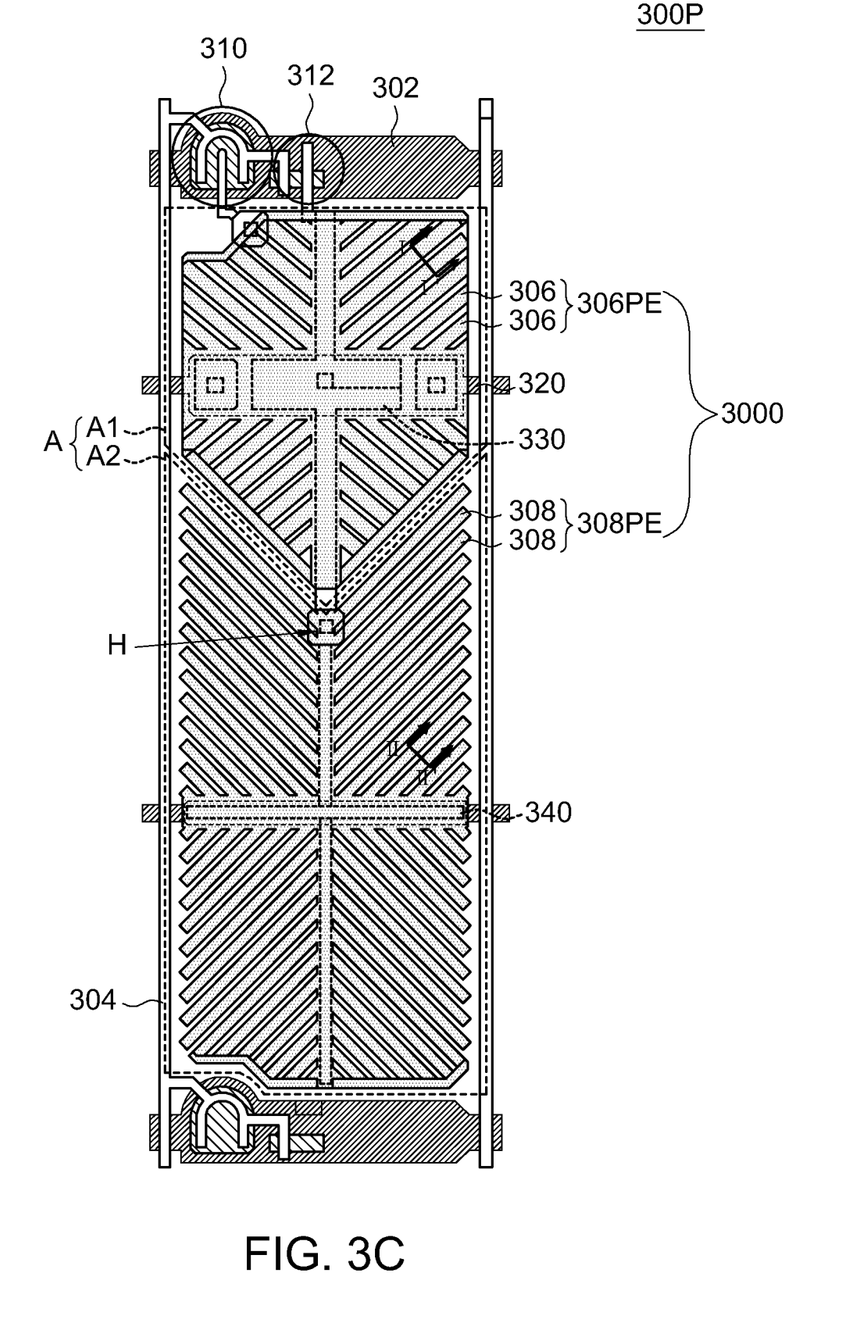
FIG. 3C is an enlarged top view of a pixel according to the first embodiment of the present invention.
Figure 3D:
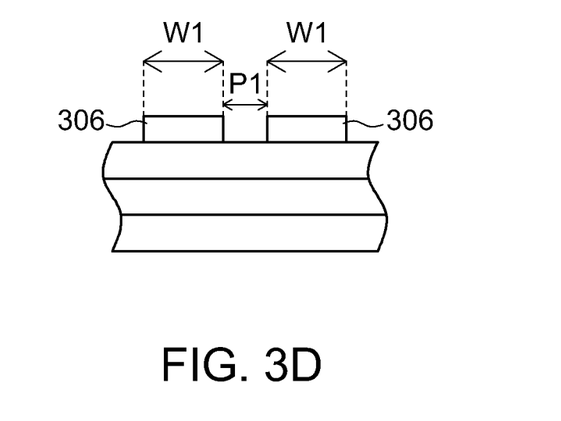
FIG. 3D is a cross section view along line I-I' in FIG. 3C.
Figure 3E:
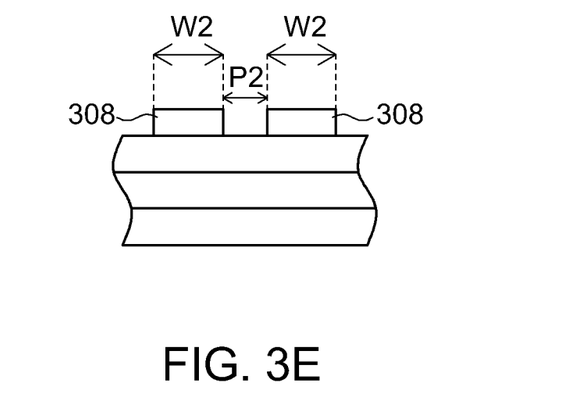
FIG. 3E is a cross section view along line II-II' in FIG. 3C.

FIG. 3A is a top view of an active array substrate according to the first embodiment of the present invention. FIG. 3B shows an equivalent circuit of a pixel area of the active array substrate 2 incorporated with the opposite substrate according to the first embodiment of the present invention. FIG. 3C is an enlarged top view of a pixel according to the first embodiment of the present invention. FIG. 3D is a cross section view along line I-I' in FIG. 3C. FIG. 3E is a cross section view along line II-II' in FIG. 3C.

In FIGS. 3A and 3B, active array substrate 300 includes base (not shown), scan lines 302, data lines 304, pixel units 3000, first common electrode 320 and second common electrode 340. For explanation, only 9 pixels 300P are shown, but not limited thereto. Scan lines 302 are disposed on the base. Data lines 304 are disposed on the base and substantially perpendicular with the scan lines 302. Pixel units 3000 are electrically connected with corresponding scan lines 302 and data lines 304. Each pixel unit 3000 includes first active device 310, second active device 312, auxiliary capacitor electrode 330, first pixel electrode 306PE and second pixel electrode 308PE. Gates (not marked) of the first active device 310 and the second active device 312 are electrically connected with same scan line 302, and source (not marked) of the first active device 310 and the second active device 312 are electrically connected with same data line 312. The first active device 310 and the second active device 312 are thin film transistors, for example.

In FIGS. 3B and 3C, pixel 300P is divided into first area A1 and second area A2 by definition of brightness. The first area A1 and the second area A2 constitute pixel area A. Drain of the first active device 310 of the pixel 300P is electrically connected with the first electrode 306PE. Drain of the second active device 312 is electrically connected with the auxiliary capacitor electrode 330. Furthermore, for example, a part of the auxiliary capacitor electrode 330 is extending toward the next scan line 302 and electrically connected with the second pixel electrode 308PE via the contact hole H.

The first pixel electrode 306PE, the first common electrode 320 and the auxiliary capacitor electrode 330 are substantially located in the first area A1. The second pixel electrode 308PE and the second common electrode 340 are substantially located in the second area A2. Each of the first pixel electrode 306PE and the second pixel electrode 308PE has first strip electrodes 306 and second strip electrodes 308. The first strip electrodes 306 and the second strip electrodes 308 constitute a fishbone. Most structure and elements of the active array substrate 300 can take Taiwan patent application No. 96135918 for reference, which is incorporated herein.

FIGS. 3D and 3E are cross section views along line I-I' and II-II' in FIG. 3C, respectively. In first area A1, the width w1 of the first strip electrodes 306 is about 3 micrometers (um) to 8 um. First strip electrodes 306 have substantially identical width w1. Gap p1, which is so-called width of the slit, between two adjacent first strip electrodes 306 is about 2 um to 5 um. In second area A2, the width w2 of the second strip electrodes 308 is about 3 micrometers (um) to 8 um. Second strip electrodes 308 have substantially identical width w2. Gap p2, which is so-called width of the slit, between two adjacent second strip electrodes 308 is about 2 um to 5 um. Specifically, the sum of the width w1 of one of the first strip electrodes 306 and the gap p1 of two adjacent first strip electrodes 306 is greater than that of the width w2 of one of the second strip electrodes 308 and the gap p2 of two adjacent second strip electrodes 308.

In the present embodiment, the width w1 of the first strip electrodes 306 is about 7 um, for example. Gap p1 between two adjacent first strip electrodes 306 is about 3 um, for example. The width w2 of the second strip electrodes 308 is about 5 um, for example. Gap p2 between two adjacent second strip electrodes 308 is about 3 um, for example.

In FIG. 3B, in the first area A1, the auxiliary capacitor electrode 330 and the first pixel electrodes 306PE form a coupling capacitor Cx, the first common electrode 320 and the first pixel electrode 309PE form a first storage capacitor CST1, and the first pixel electrode 309PE and the common electrode 21 form a first liquid crystal capacitor CLC1. In the second area A2, the second common electrode 340 and the second pixel electrode 308PE form a second storage capacitor CST2, and the second pixel electrode 308PE and the common electrode 21 form a second liquid crystal capacitor CLC2. The common electrode 21 is provided with common voltage COM.

The present embodiment further provides a method for driving the liquid crystal display panel 1. The method includes the liquid crystal display panel 1 as the present embodiment. When the liquid crystal display panel 1 is driven to display a expected low gray level image, the method includes sequentially providing scan signal to the first active device 310 and the second active device 312 via the scan line 302, and providing low gray level data voltage to the first pixel electrode 306PE via the data line 304 and the first active device 310, to make the brightness of the first area A1 greater than that of the second area A2 of the pixel 300P to display a low gray level image. Because the size (W/L, for example) of the second active device 312 is smaller than that of the first active device 310, and the coupling capacitor Cx affects the electric filed, at the present moment, the operating voltage of the first area A1 is greater than that of the second area A2. The low gray level data voltage is about 0 volt to 20 volt.

When the liquid crystal display panel 1 is driven to display a expected high gray level image, the method further includes providing high gray level data voltage to the first pixel electrode 306PE, so that the brightness difference between the first area A1 and second area A2 of the pixel 300P in response to the high gray level image is smaller than the brightness difference between the first area A1 and second area A2 of the pixel 300P in response to the low gray level image. When displaying high gray level image, although the brightness of the first area A1 is slightly greater than that of the second area A2, the first area A1 and the second area A2 can be defined to bright areas, however. The high gray level data voltage is about 0 volt to 30 volt, for example.

In the present embodiment, the active array substrate 300 is used to make the liquid crystal display panel have uniform brightness. When displaying low gray level image, because the width w1 of the first strip electrodes 306 is greater than the width w2 of the second strip electrodes 308, and the gaps p1 and p2 are substantially identical, the effects of brightness reduction is limited in the first area A1, which is so-called bright area. Such that when considering (ΔW)/W, as the smaller the (ΔW)/W is, the phenomenon of non-uniform light transmitting ratio in said area is not significant. ΔW is the difference of the biggest width W of the strip electrode and the smallest width W of the strip electrode in said area. As a result, when the process variation is substantially identical in different areas, that means ΔW is about a constant. The brightness of the dark area (the second area A2) can be ignored due to variation of the light transmitting ratio is very small. Uniformity of the brightness of the first area A1 is improved because the width w1 of the first strip electrodes 306 in the first area A1 is greater than the width w2 of the second strip electrodes 308 in the second area A2.

Figure 6:
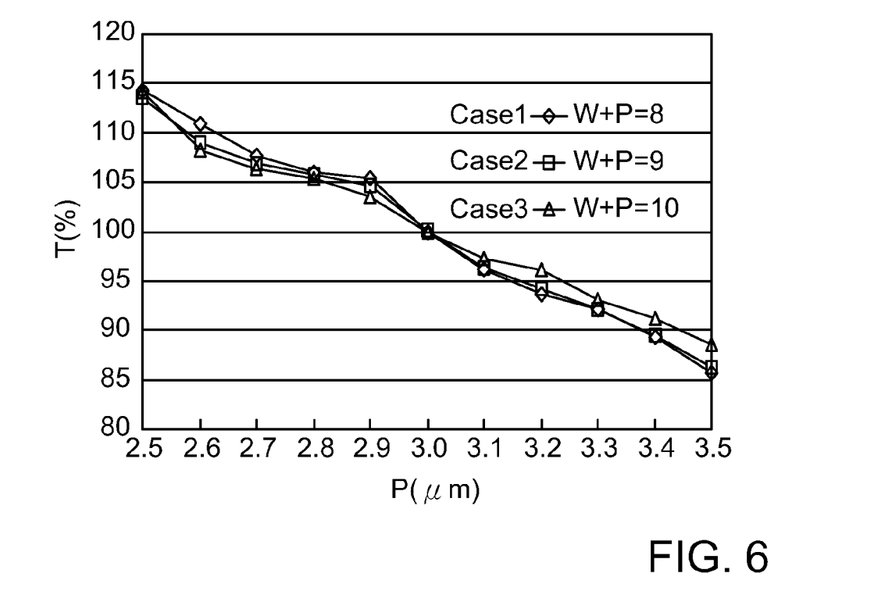
FIG. 6 shows gap (um) between adjacent strip electrodes (X-axis) vs. standard deviation of light transmitting ratio of panel (%) (Y-axis), wherein the pixel is under low gray level analyzed by Expert LCD.

FIG. 6 shows gap (um) between adjacent strip electrodes (X-axis) vs. standard deviation of light transmitting ratio of panel (%) (Y-axis), wherein the pixel is under low gray level analyzed by Expert LCD. Case 1 is w+p=8 um, case 2 is w+p=9 um, and case 3 is w+p=10 um. As compared case 1 and case 3 for p value being located between 2.8 um to 3.2 um, the variation of normalized light transmitting ratio of panel (%) is about 106% to about 93% in case 1, and the variation of normalized light transmitting ratio of panel (%) is about 105% to about 96% in case 3, which is better than case 1. Therefore, designer may make bright area of one pixel under the condition of case 3, and make dark area thereof under the condition of case 1.

Second Embodiment

Figure 4A:
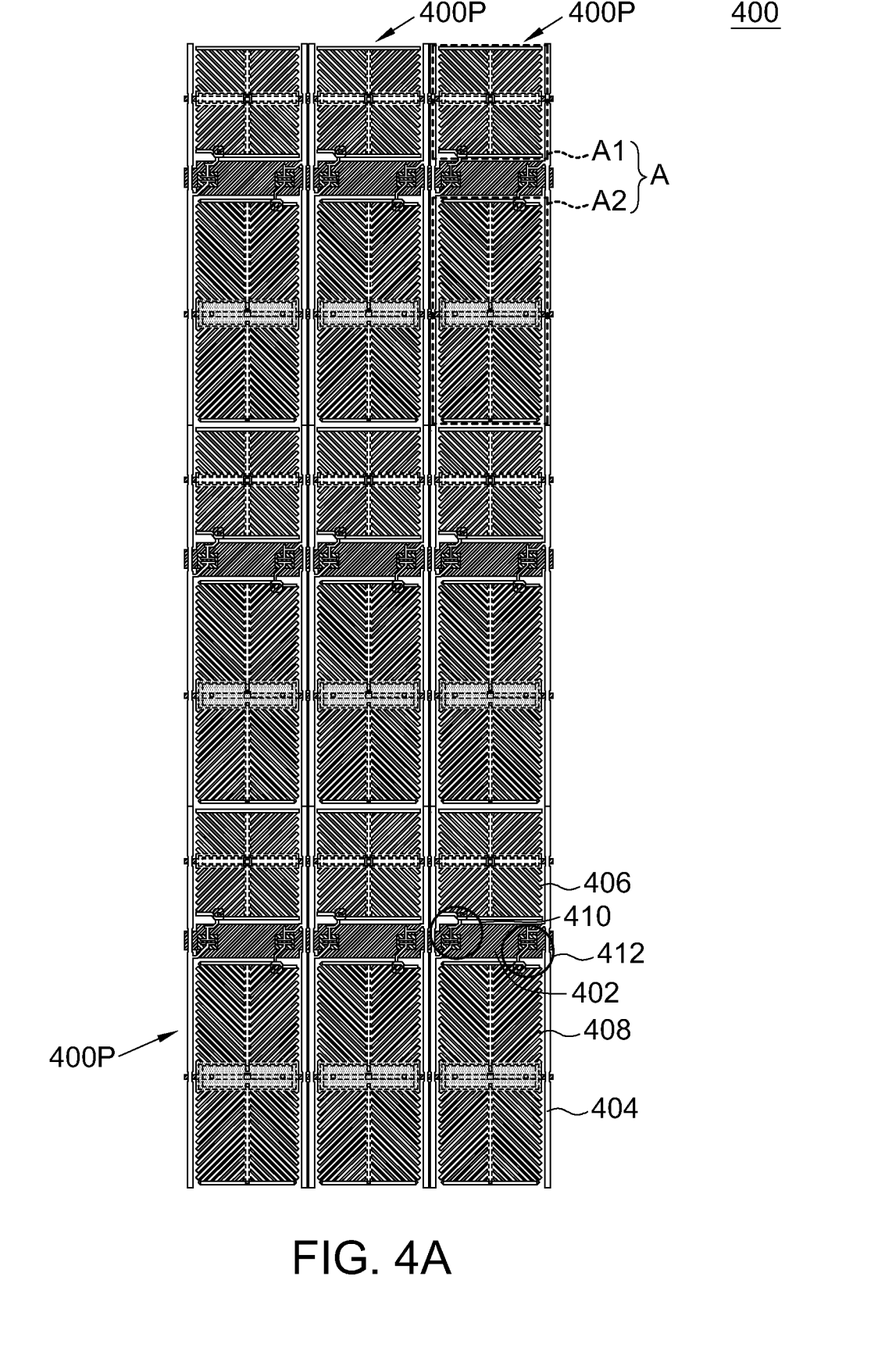
FIG. 4A is a top view of an active array substrate according to the second embodiment of the present invention.
Figure 4B:
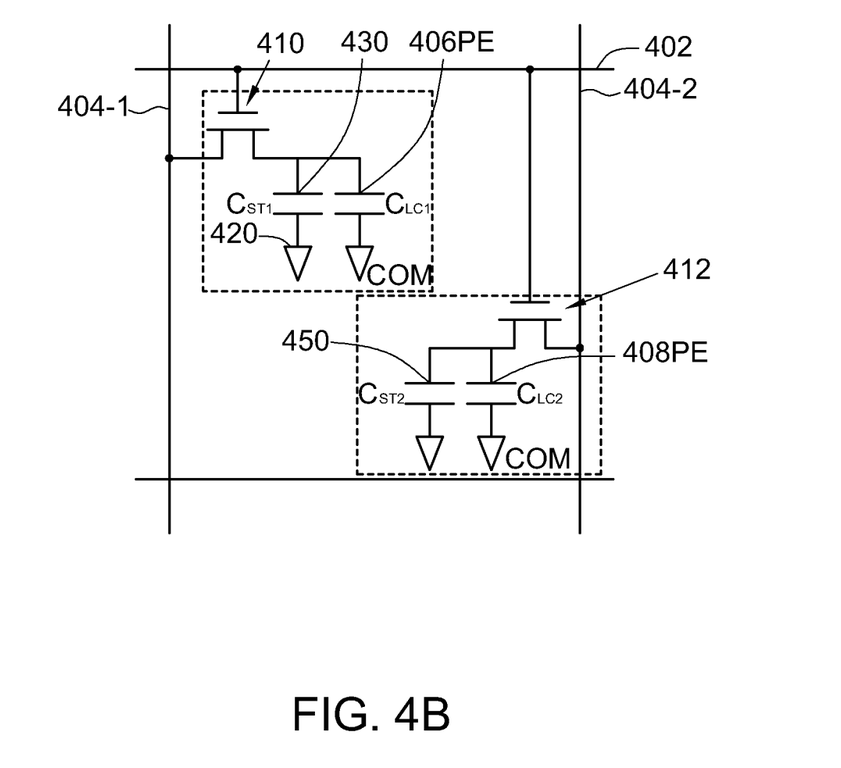
FIG. 4B shows an equivalent circuit of a pixel area of the active array substrate incorporated with the opposite substrate according to the second embodiment of the present invention.
Figure 4C:
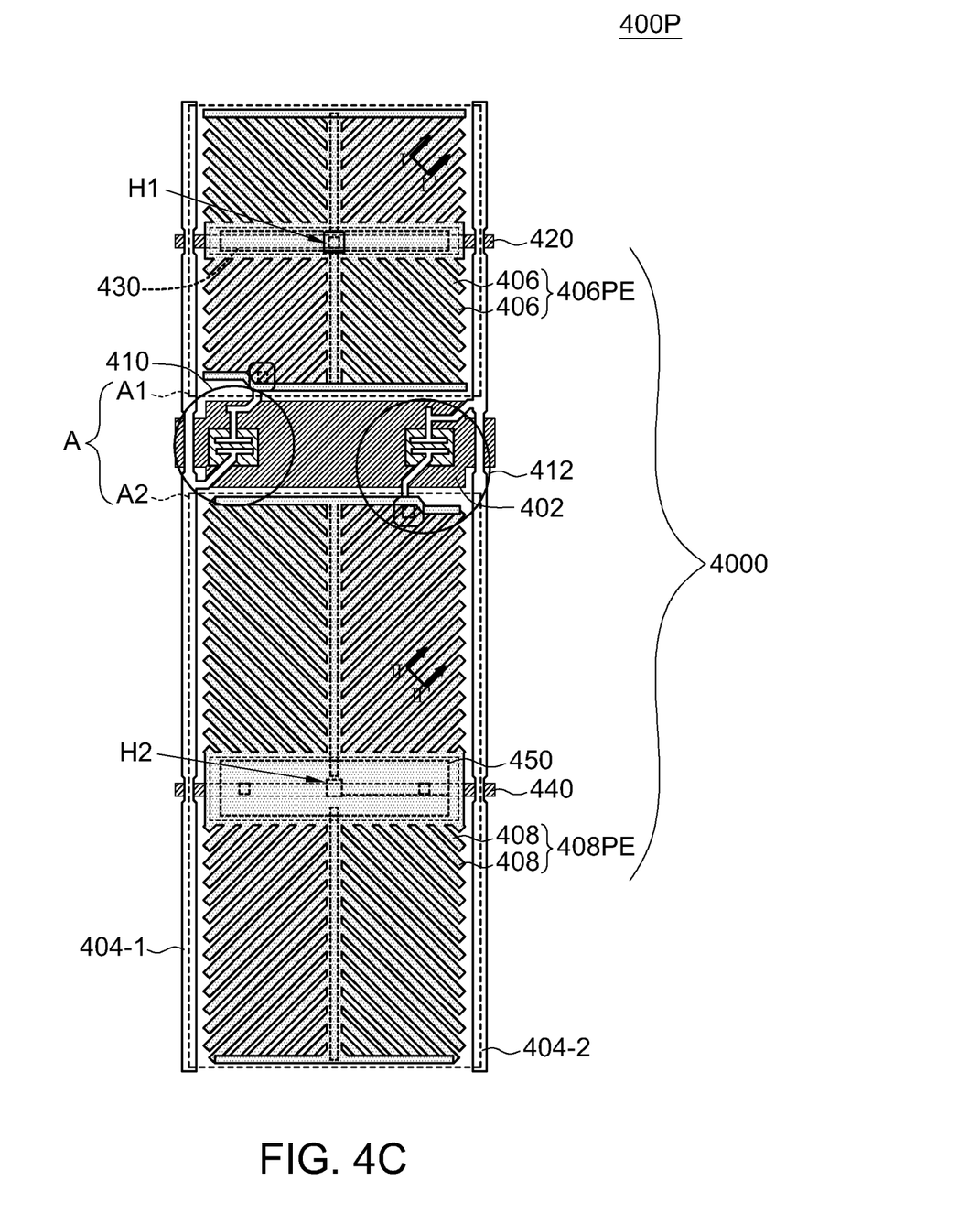
FIG. 4C is an enlarged top view of a pixel according to the second embodiment of the present invention.
Figure 4D:
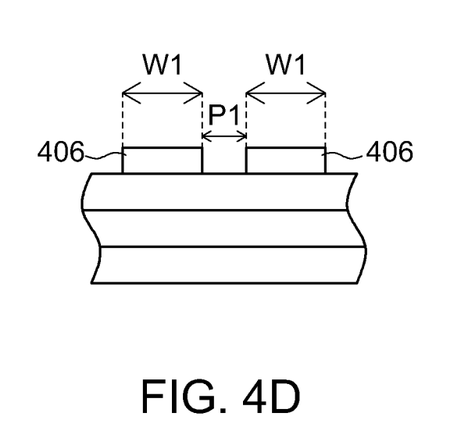
FIG. 4D is a cross section view along line I-I' in FIG. 4C.
Figure 4E:
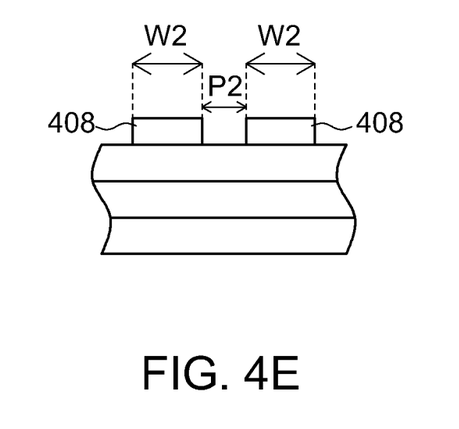
FIG. 4E is a cross section view along line II-II' in FIG. 4C.

FIG. 4A is a top view of an active array substrate according to the second embodiment of the present invention. FIG. 4B shows an equivalent circuit of a pixel area of the active array substrate incorporated with the opposite substrate 2 according to the second embodiment of the present invention. FIG. 4C is an enlarged top view of a pixel according to the second embodiment of the present invention. FIG. 4D is a cross section view along line I-I' in FIG. 4C. FIG. 4E is a cross section view along line II-II' in FIG. 4C.

In FIGS. 4A and 4B, active array substrate 400 includes base (not shown), scan lines 402, data lines 404, pixel units 4000, first common electrode 420 and second common electrode 440. For explanation, only 9 pixels 400P are shown, but not limited thereto. Scan lines 402 are disposed on the case. Data lines 404 are disposed on the base and substantially perpendicular with the scan lines 402. Pixel units 4000 are electrically connected with corresponding scan lines 402 and data lines 404. Each pixel unit 4000 includes first active device 410, second active device 412, auxiliary capacitor electrode 430, first pixel electrode 406PE and second pixel electrode 408PE. Gates (not marked) of the first active device 410 and the second active device 412 are electrically connected with same scan line 402. Source (not marked) of the first active device 410 is electrically connected with data line 404-1. Source (not marked) of the second active device 410 is electrically connected with data line 404-2. The first active device 410 and the second active device 412 are thin film transistors, for example.

In FIGS. 4B and 4C, pixel 400P is divided into first area A1 and second area A2 by definition of brightness. The first area A1 and the second area A2 constitute pixel area A. The size of the first area A1 may be the same or different as that of the second area A2. Drain of the first active device 410 of the pixel 400P is electrically connected with the first electrode 406PE. The first pixel electrode 406PE is electrically connected with the first auxiliary capacitor electrode 430 via the contact hole H1. Drain of the second active device 412 is electrically connected with the second pixel electrode 408PE. The second pixel electrode 408PE is electrically connected with the second auxiliary capacitor electrode 450 via contact hole H2. The first auxiliary capacitor electrode 430, second auxiliary capacitor electrode 450, and data lines 404 (404-1, 404-2) may be patterned by a same layer, for example. The first auxiliary capacitor electrode 430 or the second auxiliary capacitor electrode 450 may be cross shaped. The size of the first auxiliary capacitor electrode 430 may be smaller than that of the second auxiliary capacitor electrode 450, for example.

The first pixel electrode 406PE, the first common electrode 420 and the first auxiliary capacitor electrode 430 are substantially located in the first area A1. The second pixel electrode 408PE, the second auxiliary capacitor electrode 450 and the second common electrode 440 are substantially located in the second area A2. Each of the first pixel electrode 406PE and the second pixel electrode 408PE has first strip electrodes 406 and second strip electrodes 408. The first strip electrodes 406 and the second strip electrodes 408 constitute a fishbone. Most structure and elements of the active array substrate 400 can take Taiwan patent application No. 96135918 for reference, which is incorporated herein.

FIGS. 4D and 4E are cross section views along line I-I' and II-II' in FIG. 4C, respectively. In first area A1, the width w1 of the first strip electrodes 406 is about 3 micrometers (um) to 8 um. First strip electrodes 406 have substantially identical width w1. Gap p1, which is so-called width of the slit, between two adjacent first strip electrodes 406 is about 2 um to 5 um. In second area A2, the width w2 of the second strip electrodes 408 is about 3 micrometers (um) to 8 um. Second strip electrodes 408 have substantially identical width w2. Gap p2, which is so-called width of the slit, between two adjacent second strip electrodes 408 is about 2 um to 5 um. Specifically, the sum of the width w1 of one of the first strip electrodes 406 and the gap p1 of two adjacent first strip electrodes 406 is greater than that of the width w2 of one of the second strip electrodes 408 and the gap p2 of two adjacent second strip electrodes 408.

In the present embodiment, the width w1 of the first strip electrodes 406 is about 5 um, for example. Gap p1 between two adjacent first strip electrodes 406 is about 3.5 um, for example. The width w2 of the second strip electrodes 408 is about 5 um, for example. Gap p2 between two adjacent second strip electrodes 408 is about 3 um, for example.

In FIG. 4B, in the first area A1, the first auxiliary capacitor electrode 430 and the first common electrode 420 form a first storage capacitor CST1, and the first pixel electrode 406PE and the common electrode 21 form a first liquid crystal capacitor CLC1. In the second area A2, the second auxiliary capacitor electrode 420 and the second common electrode 440 form a second storage capacitor CST2, and the second pixel 408PE and the common electrode 21 form a second liquid crystal capacitor CLC2. The common electrode 21 is provided with common voltage COM.

The present embodiment further provides a method for driving the liquid crystal display panel 1. The method includes the liquid crystal display panel 1 as the present embodiment. When the liquid crystal display panel 1 is driven to display a expected low gray level image, the method includes sequentially providing scan signal to the first active device 410 and the second active device 412 via the scan line 402, and providing low gray level data voltage to the first pixel electrode 406PE via the data line 404-1 and the first active device 410, to make the brightness of the first area A1 greater than that of the second area A2 of the pixel 400P to display a low gray level image. The operative voltage of the first area A1 is greater than that of the second area A2. The low gray level data voltage is about 0 volt to 20 volt.

When the liquid crystal display panel 1 is driven to display a expected high gray level image, the method further includes providing first high gray level data voltage to the first pixel electrode 406PE via data line 404-1, and providing second high gray level data voltage to the second pixel electrode 408PE via the data line 404-2, so that the brightness difference between the first area A1 and second area A2 of the pixel 400P in response to the high gray level image is smaller than the brightness difference between the first area A1 and second area A2 of the pixel 400P in response to the low gray level image. When displaying high gray level image, although the brightness of the first area A1 is slightly greater than that of the second area A2, the first area A1 and the second area A2 can be defined to bright areas, however. The high gray level data voltage is about 0 volt to 30 volt, for example.

In the present embodiment, the active array substrate 400 is used to make the liquid crystal display panel have uniform brightness. When displaying low gray level image, because the gap p1 between two adjacent first strip electrodes 406 is greater than the gap p2 between two adjacent second strip electrodes 408, and the widths w1 and w2 are substantially identical, the effects of brightness reduction is limited in the first area A1, which is so-called bright area. Such that when considering (Δp)/p, as the smaller the (Δp)/p is, the phenomenon of non-uniform light transmitting ratio in said area is not significant. Δp is the difference of the biggest gap p between the adjacent strip electrodes and the smallest gap p between the adjacent strip electrodes in said area. As a result, when the process variation is substantially identical in different areas, that means Δp is about a constant. The brightness of the dark area (the second area A2) can be ignored due to variation of the light transmitting ratio is very small. Uniformity of the brightness of the first area A1 is improved because the gap p1 between the adjacent first strip electrodes 406 in the first area A1 is greater than gap p2 between the adjacent second strip electrodes 408 in the second area A2.

Third Embodiment

Figure 5A:
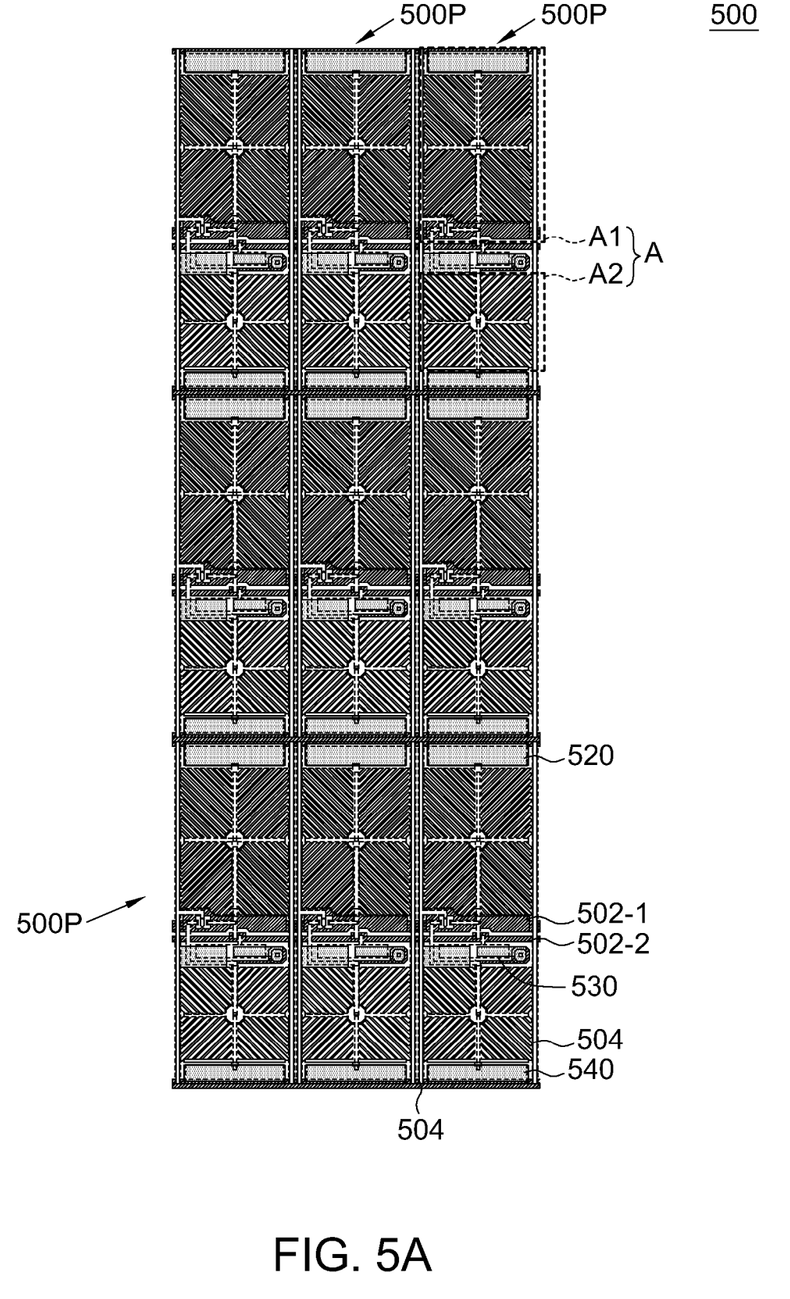
FIG. 5A is a top view of an active array substrate according to the third embodiment of the present invention.
Figure 5B:
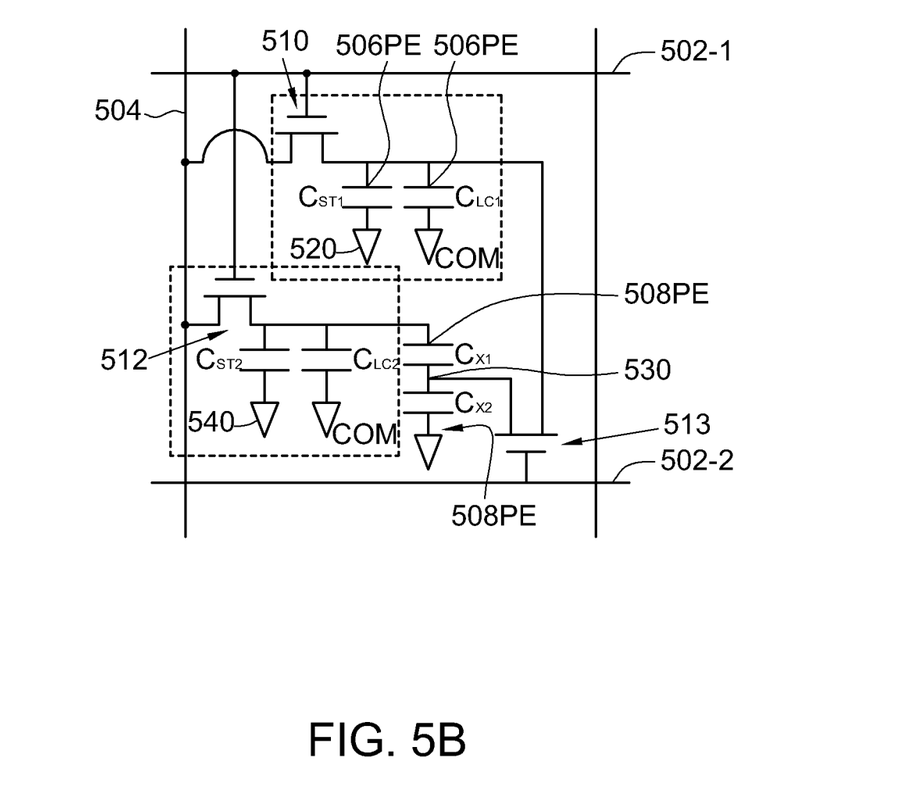
FIG. 5B shows an equivalent circuit of a pixel area of the active array substrate incorporated with the opposite substrate according to the third embodiment of the present invention.
Figure 5C:
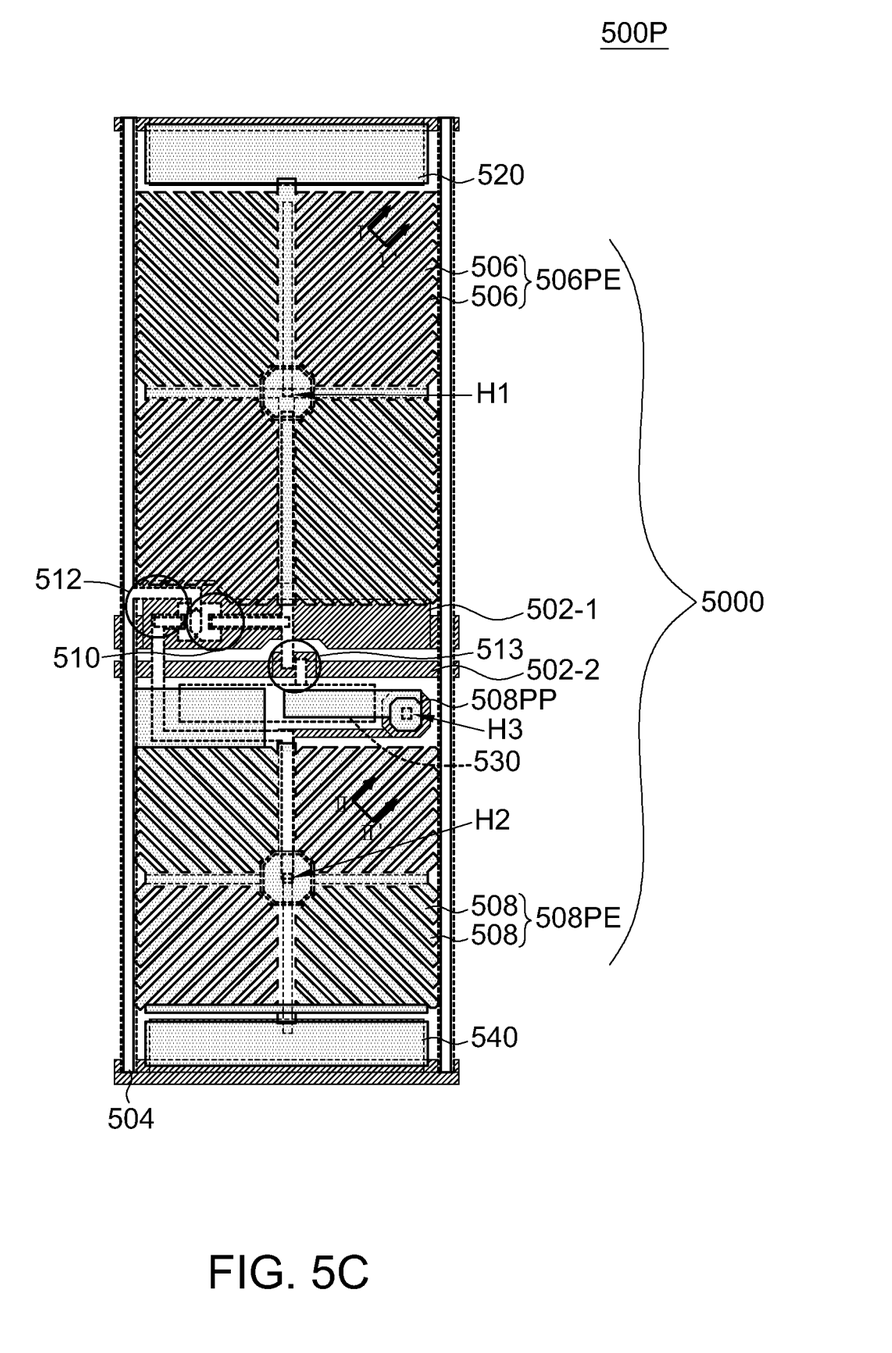
FIG. 5C is an enlarged top view of a pixel according to the third embodiment of the present invention.
Figure 5D:
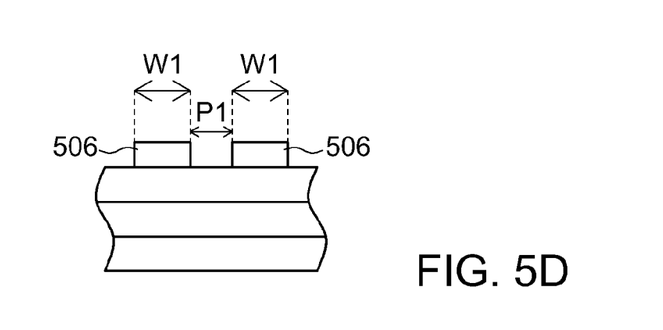
FIG. 5D is a cross section view along line I-I' in FIG. 5C.
Figure 5E:
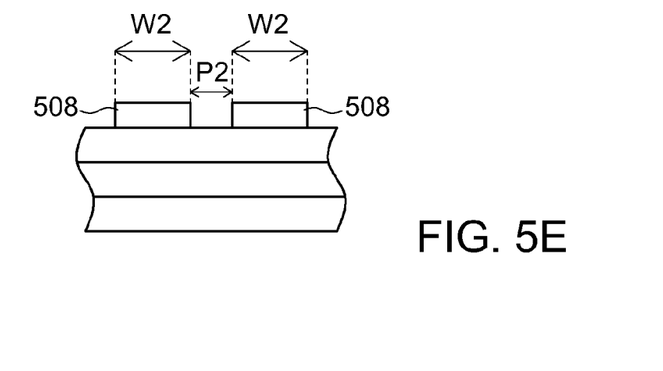
FIG. 5E is a cross section view along line II-II' in FIG. 5C.

FIG. 5A is a top view of an active array substrate according to the third embodiment of the present invention. FIG. 5B shows an equivalent circuit of a pixel area of the active array substrate 2 incorporated with the opposite substrate according to the third embodiment of the present invention. FIG. 5C is an enlarged top view of a pixel according to the third embodiment of the present invention. FIG. 5D is a cross section view along line I-I' in FIG. 5C. FIG. 5E is a cross section view along line II-II' in FIG. 5C.

In FIGS. 5A and 5B, active array substrate 500 includes base (not shown), scan lines 502, data lines 504, pixel units 5000, first common electrode 520 and second common electrode 540. For explanation, only 9 pixels 500P are shown, but not limited thereto. Scan lines 502 are disposed on the case. Data lines 504 are disposed on the base and substantially perpendicular with the scan lines 502. Pixel units 5000 are electrically connected with corresponding scan lines 502 and data lines 504. Each pixel unit 5000 includes first active device 510, second active device 512, third active device 513, auxiliary capacitor electrode 530, auxiliary pixel electrode 508PP, first pixel electrode 506PE and second pixel electrode 508PE. Gates (not marked) of the first active device 510 and the second active device 512 are electrically connected with same scan line 502-1. Sources (not marked) of the first active device 510 and the second active device 512 are electrically connected with same data line 504. Gate (not marked) of the third active device 513 is electrically connected with the scan line 502-2. Source (not marked) of the third active device 513 is electrically connected with the auxiliary capacitor electrode 530. Drain (not marked) of the third active device 513 is electrically connected with the drain of the first active device 510. The first active device 510, the second active device 512, and the third active device 513 are thin film transistors, for example.

In FIGS. 5B and 5C, pixel 500P is divided into first area A1 and second area A2 by definition of brightness. The first area A1 and the second area A2 constitute pixel area A. The size of the first area A1 may be the same or different as that of the second area A2. The size of the first area A1 may greater or smaller than that of the second area A2. Drain (not marked) of the first active device 510 is electrically connected with the first pixel electrode 506PE via contact hole H1. Drain (not marked) of the second active device 512 is electrically connected with the second pixel electrode 508PE via contact hole H2. Auxiliary pixel electrode 508PP is electrically connected with the second common electrode 540 via contact hole H3.

The first pixel electrode 506PE and the first common electrode 520 are substantially located in the first area A1. The second pixel electrode 508PE and the second common electrode 540 are substantially located in the second area A2. Each of the first pixel electrode 506PE and the second pixel electrode 508PE has first strip electrodes 506 and second strip electrodes 508. The first strip electrodes 506 and the second strip electrodes 508 constitute a fishbone. Most structure and elements of the active array substrate 500 can take Taiwan patent application No. 96135918 for reference, which is incorporated herein.

FIGS. 5D and 5E are cross section views along line I-I' and II-II' in FIG. 5C, respectively. In first area A1, the width w1 of the first strip electrodes 506 is about 3 micrometers (um) to 8 um. First strip electrodes 506 have substantially identical width w1. Gap p1, which is so-called width of the slit, between two adjacent first strip electrodes 506 is about 2 um to 5 um. In second area A2, the width w2 of the second strip electrodes 508 is about 3 micrometers (um) to 8 um. Second strip electrodes 508 have substantially identical width w2. Gap p2, which is so-called width of the slit, between two adjacent second strip electrodes 508 is about 2 um to 5 um. Specifically, the sum of the width w1 of one of the first strip electrodes 506 and the gap p1 of two adjacent first strip electrodes 506 is smaller than that of the width w2 of one of the second strip electrodes 508 and the gap p2 of two adjacent second strip electrodes 508.

In the present embodiment, the width w1 of the first strip electrodes 506 is about 5 um, for example. Gap p1 between two adjacent first strip electrodes 506 is about 3 um, for example. The width w2 of the second strip electrodes 508 is about 7 um, for example. Gap p2 between two adjacent second strip electrodes 508 is about 3.5 um, for example.

In FIG. 5B, in the first area A1, the first common electrode 520 and the first pixel electrode 506PE form a first storage capacitor CST1, and the first pixel electrode 506PE and the common electrode 21 form a first liquid crystal capacitor CLC1. In the second area A2, the second common electrode 540 and the second pixel electrode 508PE form a second storage capacitor CST2, and the second pixel 508PE and the common electrode 21 form a second liquid crystal capacitor CLC2. The second pixel electrode 508PE and the auxiliary capacitor electrode 530 form a first coupling capacitor CX1. The auxiliary pixel electrode 508PP and the auxiliary capacitor electrode 530 form a second coupling capacitor CX2. The common electrode 21 is provided with common voltage COM.

The present embodiment further provides a method for driving the liquid crystal display panel 1. The method includes the liquid crystal display panel 1 as the present embodiment. When the liquid crystal display panel 1 is driven to display a expected low gray level image, the method includes sequentially providing scan signal to the first active device 510 and the second active device 512 via the scan line 502-1, and providing low gray level data voltage to the first pixel electrode 506PE via the data line 504 and the first active device 510. At the present moment, because the third active device 513 is opened and coupling capacitor Cx1 affects the electric filed, the brightness of the first area A1 is smaller than that of the second area A2 of the pixel 500P. The operative voltage of the first area A1 is smaller than that of the second area A2. The low gray level data voltage is about 0 volt to 20 volt.

When the liquid crystal display panel 1 is driven to display a expected high gray level image, the method further includes providing high gray level data voltage to the first pixel electrode 506PE, so that the brightness difference between the first area A1 and second area A2 of the pixel 500P in response to the high gray level image is smaller than the brightness difference between the first area A1 and second area A2 of the pixel 500P in response to the low gray level image. When displaying high gray level image, although the brightness of the first area A1 is slightly smaller than that of the second area A2, the first area A1 and the second area A2 can be defined to bright areas, however. The high gray level data voltage is about 0 volt to 30 volt, for example.

In the present embodiment, the active array substrate 500 is used to make the liquid crystal display panel have uniform brightness. When displaying low gray level image, because the width w1 of the first strip electrodes 506 is smaller than the width w2 of the second strip electrodes 508, and the gaps p1 between two adjacent first strip electrodes 506 is smaller than the gap p2 between two adjacent first strip electrodes 508, the effects of brightness reduction is limited in the second area A2, which is so-called bright area. Such that when considering ($\Delta W$)/W, as the smaller the ($\Delta W$)/W is, the phenomenon of non-uniform light transmitting ratio in said area is not significant. $\Delta W$ is the difference of the biggest width W of the strip electrode and the smallest width W of the strip electrode in said area. When considering ($\Delta p$)/p, as the smaller the ($\Delta p$)/p is, the phenomenon of non-uniform light transmitting ratio in said area is not significant. $\Delta p$ is the difference of the biggest gap p between the adjacent strip electrodes and the smallest gap p between the adjacent strip electrodes in said area. As a result, when the process variation is substantially identical in different areas, that means $\Delta W$ is about a constant. The brightness of the dark area (the first area A1) can be ignored due to variation of the light transmitting ratio is very small. Uniformity of the brightness of the second area A2 is improved because the width w1 of the first strip electrodes 506 in the first area A1 is smaller than the width w2 of the second strip electrodes 508 in the second area A2.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An active array substrate, comprising:
a base;
a plurality of scan lines disposed on the base;
a plurality of data lines disposed on the base; and
a plurality of pixel units, electrically connected with the corresponding scan lines and data lines respectively, each including:
a first active device electrically connected with corresponding scan line and data line;
a second active device connected with corresponding scan line and data line;
a first pixel electrode, located in a first area, having a plurality of first strip electrodes, wherein the first pixel electrode is electrically connected with the first active device; and
a second pixel electrode, located in a second area, having a plurality of second strip electrodes, wherein the second pixel electrode is electrically connected with the second active device; wherein
there is a greater number of second strip electrodes than of first strip electrodes,
a width of a gap between two adjacent first strip electrodes is greater than a width of a gap between two adjacent second strip electrodes, and
a width of the first strip electrodes is less than a width of the second strip electrodes, so that a sum of the width of one of the first strip electrodes and the gap between two adjacent first strip electrodes is greater than that of the width of one of the second strip electrodes and the gap between two adjacent second strip electrodes.

2. The active array substrate according to claim 1, wherein the width of the one of the first strip electrodes and that of the one of the second strip electrodes is about 3 micrometers to 8 micrometers.

3. The active array substrate according to claim 1, wherein the gap between two adjacent first strip electrodes and that between two adjacent second strip electrodes is about 2 micrometers to 5 micrometers.

4. The active array substrate according to claim 3, wherein the gap between two adjacent first strip electrodes is about 3.5 micrometers, and the gap between two adjacent second strip electrodes is about 3 micrometers.

5. The active array substrate according to claim 1, wherein the first active device and the second active device of one of the pixel units are electrically connected with the same scan line and the same data line, and wherein the active array substrate further comprises a first common electrode and a second common electrode disposed on the base, each pixel unit further including a auxiliary capacitor electrode electrically connected with a drain of the second active device, the auxiliary capacitor electrode and the first pixel electrode forming a coupling capacitor, the first common electrode and the first pixel electrode forming a first storage capacitor, and the second common electrode and the second pixel electrode forming a second storage capacitor.

6. The active array substrate according to claim 5, wherein the corresponding data line of the first active device and the second active device of same pixel unit is provided with a data voltage of about 0 volt to 30 volt.

7. The active array substrate according to claim 1, wherein the first active device and the second active device of same pixel unit are electrically connected with the same scan line and different data lines, and the same scan line is located between the first area and the second area.

8. The active array substrate according to claim 7, wherein the data line electrically connected with the first active device is provided with a data voltage of 0 volt to 30 volt, and the data line electrically connected with the second active device is provided with a data voltage of 0 volt to 30 volt.

9. The active array substrate according to claim 7, further comprising a first common electrode and a second common electrode disposed on the base, wherein the first common electrode and the first pixel electrode form a first storage capacitor, and the second common electrode and the second pixel electrode form a second storage capacitor.

10. The active array substrate according to claim 1, wherein the first active device and the second active device of each pixel unit are electrically connected with the same scan line and the same data line, the active array substrate further comprising a first common electrode and a second common electrode disposed on the base, and the each of the pixel units further including:

a third active device, having a gate electrically connected with another scan line; an auxiliary capacitor electrode electrically connected with a source of the third active device; and an auxiliary pixel electrode electrically connected with the second common electrode.

11. The active array substrate according to claim 10, wherein the first common electrode and the first pixel electrode form a first storage capacitor, the second common electrode and the second pixel electrode form a second storage capacitor, the second pixel electrode and the auxiliary capacitor electrode form a first coupling capacitor, and the auxiliary pixel electrode and the auxiliary capacitor electrode form a second coupling capacitor.

12. The active array substrate according to claim 10, wherein the corresponding data line of the first active device and the second active device of same pixel unit is provided with a data voltage of about 0 volt to 30 volt.

13. The active array substrate according to claim 1, wherein the brightness of the first area is greater than that of the second area.

14. A liquid crystal display panel, comprising:
the active array substrate according to claim 1;
an opposite substrate; and
a liquid crystal layer disposed between the active array substrate and the opposite substrate.

15. A method for driving a liquid crystal display panel, comprising:
providing the liquid crystal display panel according to claim 14; and
providing a low gray level data voltage to the first pixel electrode of one of the pixel units, to make the brightness of the first area greater than that of the second area thereof to display a low gray level image; and
providing a high gray level data voltage to the first pixel electrode of the one of the pixel units, to make the brightness of the first area substantially equal to that of the second area thereof to display a high gray level image.

16. The method according to claim 15, wherein the low gray level data voltage is about 0 volt to 20 volt, and the high gray level data voltage is about 0 volt to 30 volt.

17. The method according to claim 15, further comprising:
providing a first high gray level data voltage to the first pixel electrode of one of the pixel units; and
providing a second high gray level data voltage to the second pixel electrode of the one of the pixel units to make the brightness of the first area substantially equal to that of the second area thereof to display a high gray level image.

18. The method according to claim 17, wherein the first high gray level data voltage is about 0 volt to 30 volt, and the second high gray level data voltage is about 0 volt to 30 volt.

19. The method according to claim 15, wherein the size of the first area is smaller than the size of the second area.

20. The active array substrate according to claim 1, wherein the size of the first area is smaller than the size of the second area.

* * * * *